United States Patent
Xie

(10) Patent No.: US 9,643,853 B2
(45) Date of Patent: May 9, 2017

(54) SYNTHESIS OF GME FRAMEWORK TYPE ZEOLITES

(71) Applicant: Dan Xie, Richmond, CA (US)

(72) Inventor: Dan Xie, Richmond, CA (US)

(73) Assignee: CHEVRON U.S.A. INC, San Ramon, CA (US)

( * ) Notice: Subject to any disclaimer, the term of this patent is extended or adjusted under 35 U.S.C. 154(b) by 348 days.

(21) Appl. No.: 14/605,542

(22) Filed: Jan. 26, 2015

(65) Prior Publication Data

US 2016/0214867 A1    Jul. 28, 2016

(51) Int. Cl.
| | |
|---|---|
| *C01B 39/46* | (2006.01) |
| *C01B 39/02* | (2006.01) |
| *C01B 39/06* | (2006.01) |
| *B01J 20/18* | (2006.01) |

(52) U.S. Cl.
CPC ............ *C01B 39/46* (2013.01); *C01B 39/026* (2013.01); *C01B 39/06* (2013.01); *B01J 20/18* (2013.01)

(58) Field of Classification Search
CPC ........ C01B 39/026; C01B 39/46; B01J 29/70; B01J 20/18
See application file for complete search history.

(56) References Cited

U.S. PATENT DOCUMENTS

| | | | |
|---|---|---|---|
| 4,061,717 A | 12/1977 | Kerr et al. | |
| 5,283,047 A * | 2/1994 | Vaughan | ................. C01B 39/06 208/46 |
| 6,187,283 B1 | 2/2001 | Chiyoda et al. | |
| 6,436,364 B1 | 8/2002 | Chiyoda et al. | |
| 6,551,573 B2 * | 4/2003 | Huo | ....................... B01D 15/00 423/705 |
| 9,364,782 B1 * | 6/2016 | Xie | ....................... B01D 71/028 |
| 2016/0243531 A1 * | 8/2016 | Dusselier | ................. C07C 1/20 |
| 2016/0243532 A1 * | 8/2016 | Dusselier | ................. C07C 1/20 |

OTHER PUBLICATIONS

PCT International Search Report, International Application No. PCT/US2015/052911, mailed Dec. 16, 2015.
K. Honda, M. Itakura, Y. Matsuura, A. Onda, Y. Ide, M. Sadakane and T. Sano "Role of Structural Similarity Between Starting Zeolite and Product Zeolite in the Interzeolite Conversion Process" J. Nanosci. Nanotechnol. 2013, 13, 3020-3026.
O. Chiyoda and M.E. Davis "Hydrothermal conversion of Y-zeolite using alkaline-earth cations" Micropor. Mesopor. Mater. 1999, 32, 257-264.
G.T. Kokotailo and S.L. Lawton Possible Structures Related to Gmelinite Nature 1964, 203, 621-623.
R.H. Daniels, G.T. Kerr and L.D. Rollmann "Cationic Polymers as Templates in Zeolite Crystallization" J. Am. Chem. Soc. 1978, 100, 3097-3100.

* cited by examiner

*Primary Examiner* — David M Brunsman
(74) *Attorney, Agent, or Firm* — Terrence M. Flaherty

(57) ABSTRACT

An organotemplate-free synthetic process is disclosed for the production of GME framework type zeolites by hydrothermal conversion of FAU framework type zeolites with sodium cations. The resulting zeolite product is substantially free of non-GME framework type material.

8 Claims, 2 Drawing Sheets

SYNTHESIS OF GME FRAMEWORK TYPE ZEOLITES

TECHNICAL FIELD

This disclosure relates generally to the synthesis of GME framework type zeolites.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the "*Atlas of Zeolite Framework Types*," Sixth Revised Edition, Elsevier, 2007.

Zeolitic materials of the GME framework type are characterized by a three-dimensional channel system composed of 12-membered ring channels interconnected at right angles by a two-dimensional system of 8-membered ring channels. Gmelinite is a naturally occurring sodium-calcium zeolite of the GME framework type and has a typical composition of $8Na_2O:4CaO:Al_2O_3:4SiO_2:6H_2O$.

U.S. Pat. No. 4,061,717 reports the preparation of fault-free gmelinite using quaternary ammonium polymers as a structure directing agent.

U.S. Pat. No. 6,187,283 discloses the organotemplate-free hydrothermal conversion of low $SiO_2/Al_2O_3$ mole ratio (SAR) Y-zeolite (FAU framework type, SAR=4.0-4.8) to gmelinite with strontium cations, under crystallization conditions including a temperature of 240° C. and a time of 14 days. Hydrothermal conversion of Y-zeolite with inorganic cations other than strontium produced materials other than synthetic gmelinite.

Conventional natural and synthetic gemlinite have a propensity to intergrow with chabazite or related zeolites, resulting in blockage of the 12-membered ring channel of the gmelinite structure and poor sorption properties resulting from a variety of possible intergrowths.

It has now been found that GME framework type zeolites substantially free of non-GME framework type material can be synthesized by organotemplate-free hydrothermal conversion of FAU framework type zeolites with sodium cations, under mild crystallization conditions.

The GME framework type zeolites disclosed herein can be suitable for selectively separating carbon dioxide ($CO_2$) from multi-component gas feedstreams containing $CO_2$ and at least one other gas component.

SUMMARY

In one aspect, there is provided an organotemplate-free synthetic process for the production of a GME framework type zeolite, the process comprising: (a) preparing an organotemplate-free reaction mixture containing: (1) a FAU framework type zeolite; (2) at least one source of sodium cations; (3) hydroxide ions; and (4) water; and (b) subjecting the reaction mixture to crystallization conditions sufficient to form crystals of the GME framework type zeolite.

In another aspect, there is provided a GME framework type zeolite substantially free of non-GME framework type material and having a composition, in the non-calcined and anhydrous state, in terms of mole ratios, as follows:

$$xNa_2O:Al_2O_3:ySiO_2$$

wherein $0<x\leq1$; and y has a value from 3 to 8.

DETAILED DESCRIPTION

Introduction

Figure 1:
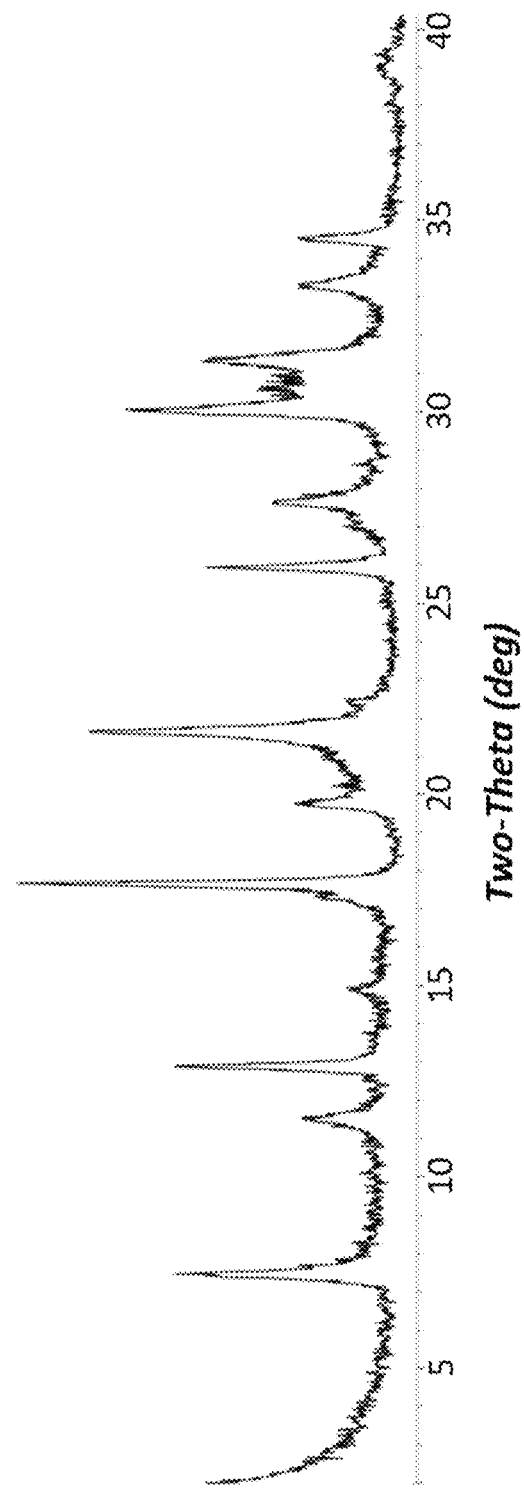
FIG. 1 is a powder XRD pattern of the zeolite prepared in Example 1.

The following terms will be used throughout the specification and will have the following meanings unless otherwise indicated.

The term "zeolite" refers to crystalline aluminosilicate compositions which are microporous and which are formed from corner sharing $AlO_2$ and $SiO_2$ tetrahedra.

The term "framework type" is used in the sense described in the "*Atlas of Zeolite Framework Types*," Sixth Revised Edition, Elsevier, 2007.

Reaction Mixture

In general, the GME framework type zeolite is prepared by: (a) preparing an organotemplate-free reaction mixture containing (1) a FAU framework type zeolite; (2) at least one source of sodium cations; (3) hydroxide ions; and (4) water; and (b) subjecting the reaction mixture to crystallization conditions sufficient to form crystals of the GME framework zeolite.

Examples of FAU framework type zeolites include faujasite, zeolite X, zeolite Y, and LZ-210. The FAU framework type zeolite can have a $SiO_2/Al_2O_3$ mole ratio of at least 5 (e.g., from 5 to 100, from 5 to 80, from 5 to 60, from 5 to 30, from 10 to 100, from 10 to 80, from 10 to 60, from 10 to 30, from 12 to 100, from 12 to 80, from 12 to 60, or from 12 to 30).

The composition of the reaction mixture from which the GME framework type zeolite is formed, in terms of mole ratios, is identified in Table 1 below:

TABLE 1

| | Broad | Exemplary |
|---|---|---|
| $SiO_2/Al_2O_3$ | 5 to 100 | 10 to 60 |
| $Na/SiO_2$ | 0.10 to 1.5 | 0.50 to 1.0 |
| $OH/SiO_2$ | 0.10 to 1.5 | 0.50 to 1.0 |
| $H_2O/SiO_2$ | 2 to 100 | 4 to 40 |

Sources of silicon in addition to the FAU framework type zeolite include fumed silica, precipitated silicates, silica hydrogel, silicic acid, colloidal silica, tetra-alkyl orthosilicates (e.g., tetraethyl orthosilicate), and silica hydroxides.

Sources of aluminum in addition to the FAU framework type zeolite include alumina, aluminum hydroxide, alkali metal aluminates, aluminum alkoxides, and water-soluble aluminum salts, such as aluminum nitrate.

Sources of sodium include oxides, hydroxides, nitrates, sulfates, halides, acetates, oxalates, and citrates thereof.

One feature of the process disclosed herein is that the reaction mixture is substantially free of strontium cations. The term "substantially free of strontium cations" as employed herein means that strontium cations are completely absent from the reaction mixture or are present in quantities that have less than a measurable effect on, or confer less than a material advantage to, the synthesis of the GME framework type described herein (e.g., $Sr^{2+}$ is present in the reaction mixture as an impurity of one or more of the reactants, for example, in an amount of 0.001 wt. % or less, preferably 0.00001 wt. % or less).

Optionally the reaction mixture can contain seed crystals. It is well known that seeding a zeolite synthesis mixture frequently has beneficial effects, for example in controlling the particle size of the product, avoiding the need for an organic template, accelerating synthesis, and improving the proportion of product that is of the intended framework type. When used, seed crystals are added in an amount such that the weight ratio of seeds/$SiO_2$ in the reaction mixture can be from 0.001 to 0.3, e.g., from 0.01 to 0.08, or from 0.01 to 0.05.

Another feature of the process disclosed herein is that the reaction mixture is organotemplate-free. This is beneficial both from a cost and an environmental standpoint, since there is no need to use or dispose of conventionally used organic structure directing agents such as amines or alkylammonium compounds.

The phrase "organotemplate-free" as employed herein means that organic structure directing agents are completely absent from the reaction mixture or are present in an amount that have less than a measurable effect on, or confer less than a material advantage to, the synthesis of the GME framework type zeolites described herein (e.g., an organic structure directing agent is present in the reaction mixture as an impurity, for example, in an amount of 0.1 wt. % or less, preferably 0.01 wt. % or less, more preferably 0.001 wt. % or less). Furthermore, it is noted that the terms "organotemplate" and "organic structure directing agent" are synonymously used in the present disclosure.

The term "organotemplate" as employed in the present application designates any conceivable organic material which is suitable for template-mediated synthesis of a zeolite material, preferably of a zeolite material having a GME framework type structure. Such organotemplates include, e.g., quaternary ammonium polymers as described in U.S. Pat. No. 4,061,717.

For each embodiment described herein, the reaction mixture can be supplied by more than one source. Also, two or more reaction components can be provided by one source.

The reaction mixture can be prepared either batch wise or continuously. Crystal size, morphology and crystallization time of the GME framework type zeolite described herein can vary with the nature of the reaction mixture and the crystallization conditions.

Crystallization and Post-Synthesis Treatment

In practice, the GME framework type zeolite is synthesized by: (a) preparing an organotemplate-free reaction mixture as described herein above; and (b) subjecting the reaction mixture to hydrothermal crystallization conditions sufficient to form crystals of the GME framework type zeolite.

The reaction mixture is maintained at an elevated temperature until the crystals of the GME framework zeolite are formed. The hydrothermal crystallization is usually conducted under pressure and usually in an autoclave so that the reaction mixture is subject to autogenous pressure, at a temperature of from 120° C. to 200° C., e.g., from 120° C. to 180° C., or from 120° C. to 150° C.

Once the GME framework type zeolite crystals have formed, the solid product is separated from the reaction mixture by standard mechanical techniques such as filtration. The recovered crystals are water-washed and then dried. The drying step can be performed at atmospheric pressure or under vacuum. At this stage, the recovered crystalline GME framework type zeolite is in the non-calcined state and is free of organic structure directing agent.

The zeolite crystallized in step (b) can optionally be subject to at least one step of an ion-exchange procedure, wherein the term "ion-exchange" as used herein generally refers to non-framework ionic elements and/or molecules contained in the zeolite. In general, any conceivable ion-exchange procedure with all possible ionic elements and/or molecules can be conducted on the zeolite, with the exception of organic structure directing agents specifically used in the synthesis of zeolites having the GME framework type.

In the process of the present disclosure, it is preferred that a calcination step is not employed. In general, a calcination step involves the heating of the crystallized zeolite according to step (b) above a temperature of 500° C. More preferably, a process according to the present disclosure for the production of a GME framework type zeolite which does not comprise a calcination step refers to processes wherein the zeolitic material crystallized according to step (b) is not subject in a subsequent step to a temperature exceeding 450° C., more preferably 350° C., more preferably 300° C., more preferably 250° C., more preferably 200° C., and even more preferably 150° C. According to the present disclosure, it is particularly preferred that after completion of step (b) of the process disclosed herein, wherein the crystallized zeolite is at ambient temperature, the material is subsequently not subject to any heating process normally or suitably conducted for removal of organotemplates form a zeolite having a GME framework type structure. Within the meaning of the present disclosure, a zeolite which is "non-calcined" is one which has not been subject to any one of the aforementioned calcination procedures.

Characterization of the Zeolite

GME framework type zeolites made by the process described herein have a composition, in the non-calcined and anhydrous state, in terms of mole ratios, as follows:

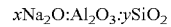

$$xNa_2O:Al_2O_3:ySiO_2$$

wherein $0 < x \leq 1$; and y has a value from 3 to 8.

The GME framework type zeolites synthesized by the process described herein are characterized by their X-ray diffraction pattern. X-ray diffraction patterns representative of GME framework type zeolites can be referenced in the "*Collection of Simulated XRD Powder Patterns for Zeolites,*" Fifth Revised Edition, Elsevier, 2007. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks, and d, the interplanar spacing corresponding to the recorded lines, can be calculated.

The crystalline GME framework type zeolite prepared in accordance with this disclosure is preferably substantially free of non-GME framework type material. By "substantially free of non-GME framework type material" is meant that the composition does not contain non-GME framework type phases, as measured by X-ray diffraction. The presence of these impurities can be determined and quantified by analysis of the X-ray diffraction pattern of a sample. The term "non-GME framework type material" used herein means any material that does not contain crystalline zeolite of the GME framework type. Examples of such non-GME framework type material include amorphous material, analcime (ANA framework type), chabazite (CHA framework type), and Y and X zeolites (FAU framework type). The non-GME framework type material can co-crystallize with the GME framework type material or mix with the GME framework type material.

EXAMPLES

The following illustrative examples are intended to be non-limiting.

Example 1

0.39 g of a 50% NaOH solution, 1.05 g of deionized water and 0.50 g of CBV712 NH$_4$—Y zeolite powder (Zeolyst International, SiO$_2$/Al$_2$O$_3$ mole ratio=12) were mixed together in a Teflon liner. The liner was then capped and placed within a Parr steel autoclave reactor. The autoclave was placed in an oven and heated at 125° C. for 5 days. The products were recovered from the cooled reactor, washed with deionized water and dried at 95° C.

Figure 2:
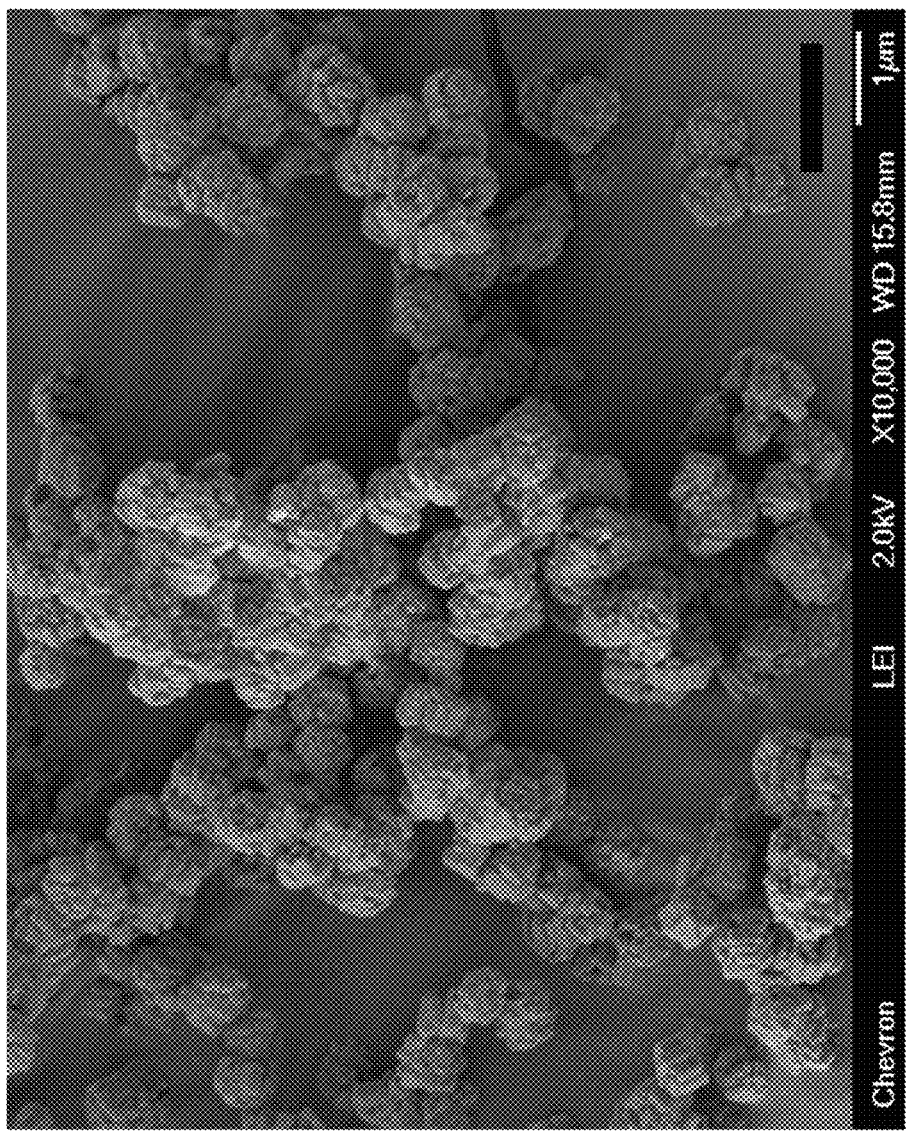
FIG. 2 is a Scanning Electron Micrograph (SEM) image of the zeolite prepared in Example 1.

The resulting as-synthesized product was analyzed by powder XRD and SEM. The powder XRD pattern is shown in FIG. 1 and indicates that the product is a pure phase GME framework type zeolite. FIG. 2 is a SEM image of the product and shows a uniform field of crystals.

The zeolite product had a SiO$_2$/Al$_2$O$_3$ mole ratio of 4.6, as determined by ICP elemental analysis.

Example 2

1.87 g of a 50% NaOH solution, 7.50 g of deionized water and 2.00 g of CBV720 H—Y zeolite powder (Zeolyst International, SiO$_2$/Al$_2$O$_3$ mole ratio=30) were mixed together in a Teflon liner. The liner was then capped and placed within a Parr steel autoclave reactor. The autoclave was placed in an oven and heated at 125° C. for 4 days. The solid products were recovered from the cooled reactor by centrifugation, washed with deionized water and dried at 95° C.

The resulting product was identified by powder XRD and SEM as a pure phase GME framework type zeolite.

The zeolite product had a SiO$_2$/Al$_2$O$_3$ mole ratio of 5.2, as determined by ICP elemental analysis.

Example 3

0.44 g of a 50% NaOH solution, 1.19 g of deionized water and 0.50 g of CBV720 H—Y zeolite powder (Zeolyst International, SiO$_2$/Al$_2$O$_3$ mole ratio=30) were mixed together in a Teflon liner. The liner was then capped and placed within a Parr steel autoclave reactor. The autoclave was placed in an oven and heated at 125° C. for 5 days. The solid products were recovered from the cooled reactor by centrifugation, washed with deionized water and dried at 95° C.

The resulting product was identified by powder XRD and SEM as a pure phase GME framework type zeolite.

The zeolite product had a SiO$_2$/Al$_2$O$_3$ mole ratio of 5.3, as determined by ICP elemental analysis.

Example 4

0.76 g of a 50% NaOH solution, 1.04 g of deionized water and 1.00 g of CBV720 H—Y zeolite powder (Zeolyst International, SiO$_2$/Al$_2$O$_3$ mole ratio=30) were mixed together in a Teflon liner. The liner was then capped and placed within a Parr steel autoclave reactor. The autoclave was placed in an oven and heated at 125° C. for 5 days. The solid products were recovered from the cooled reactor by centrifugation, washed with deionized water and dried at 95° C.

The resulting product was identified by powder XRD and SEM as a pure phase GME framework type zeolite.

The zeolite product had a SiO$_2$/Al$_2$O$_3$ mole ratio of 5.2, as determined by ICP elemental analysis.

Example 5

0.38 g of a 50% NaOH solution, 0.52 g of deionized water and 0.50 g of CBV720 H—Y zeolite powder (Zeolyst International, SiO$_2$/Al$_2$O$_3$ mole ratio=30) were mixed together in a Teflon liner. The liner was then capped and placed within a Parr steel autoclave reactor. The autoclave was placed in an oven and heated at 125° C. while rotating at 43 rpm for 4 days. The solid products were recovered from the cooled reactor by centrifugation, washed with deionized water and dried at 95° C.

The resulting product was identified by powder XRD and SEM as a pure phase GME framework type zeolite.

The zeolite product had a SiO$_2$/Al$_2$O$_3$ mole ratio of 5.4, as determined by ICP elemental analysis.

Examples 6-10

Adsorption/desorption isotherms for $N_2$ and $CO_2$ were obtained in a constant volume isothermal system ($P_{max}$=1 atm, T=273K) for each of the zeolites prepared in Examples 1-5. All zeolites were degassed prior to measurement. The maximum adsorption capacity at equilibrium for $N_2$ and $CO_2$ are set forth in Table 2.

TABLE 2

| Example | Adsorbent | $N_2$ Adsorption Capacity (mmol/g) | $CO_2$ Adsorption Capacity (mmol/g) |
|---|---|---|---|
| Example 6 | Example 1 | 0.09 | 1.46 |
| Example 7 | Example 2 | 0.12 | 2.46 |
| Example 8 | Example 3 | 0.09 | 1.98 |
| Example 9 | Example 4 | 0.08 | 2.25 |
| Example 10 | Example 5 | 0.04 | 1.19 |

From the data indicated in Table 2, it can be deduced that that the materials synthesized according to what is specified in Examples 1-5 preferentially adsorb $CO_2$.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

Where permitted, all citations referred to herein are hereby incorporated by reference to the extent such disclosure is not inconsistent herewith.

The invention claimed is:

1. An organotemplate-free synthetic process for the production of a GME framework type zeolite, the process comprising:
   (a) preparing an organotemplate-free reaction mixture containing:
      (1) a FAU framework type zeolite;
      (2) at least one source of sodium cations;
      (3) hydroxide ions; and
      (4) water; and
   (b) subjecting the reaction mixture to crystallization conditions sufficient to form crystals of the GME framework zeolite, wherein GME framework type zeolite is substantially free of non-GME framework type material.

2. The process of claim 1, wherein the GME framework type zeolite has a composition, in the non-calcined and anhydrous state, in terms of mole ratios, as follows:

$$xNa_2O:Al_2O_3:ySiO_2$$

wherein $0<x\leq1$; and y has a value from 3 to 8.

3. The process of claim 1, wherein the GME framework type zeolite is prepared from an organotemplate-free reaction mixture comprising, in terms of mole ratios, the following:

| | |
|---|---|
| $SiO_2/Al_2O_3$ | 5 to 100 |
| $Na/SiO_2$ | 0.10 to 1.5 |
| $OH/SiO_2$ | 0.10 to 1.5 |
| $H_2O/SiO_2$ | 2 to 100. |

4. The process of claim 1, wherein the GME framework type zeolite is prepared from an organotemplate-free reaction mixture comprising, in terms of mole ratios, the following:

| | |
|---|---|
| $SiO_2/Al_2O_3$ | 10 to 60 |
| $Na/SiO_2$ | 0.50 to 1.0 |
| $OH/SiO_2$ | 0.50 to 1.0 |
| $H_2O/SiO_2$ | 4 to 40. |

5. The process of claim 1, wherein the reaction mixture is substantially free of strontium cations.

6. The process of claim 1, wherein the FAU framework type zeolite is zeolite Y.

7. The process of claim 1, wherein the crystallization conditions include a temperature of from 120° C. to 180° C.

8. The process of claim 1, wherein the organotemplate-free synthesis does not comprise a calcination step.

* * * * *